United States Patent [19]

Tamura

[11] Patent Number: 4,588,990

[45] Date of Patent: May 13, 1986

[54] IMAGE DISPLAY APPARATUS

[75] Inventor: Yasuyuki Tamura, Kawasaki, Japan

[73] Assignee: Canon Kabushiki Kaisha, Tokyo, Japan

[21] Appl. No.: 509,866

[22] Filed: Jun. 30, 1983

[30] Foreign Application Priority Data

Jul. 7, 1982 [JP] Japan ................................ 57-118097

[51] Int. Cl.⁴ ........................ G09G 3/26; G01D 15/14

[52] U.S. Cl. .................................... 340/792; 346/160; 346/158; 358/302; 340/786

[58] Field of Search ........................ 340/783, 786, 792; 346/136, 146, 107 C, 150, 151, 152, 153.1, 154, 155, 158, 160; 358/302, 300; 357/52; 430/69, 122

[56] References Cited

U.S. PATENT DOCUMENTS

| | | | |
|---|---|---|---|
| 3,219,993 | 11/1965 | Schwertz | 340/786 |
| 3,335,512 | 8/1967 | Newman | 340/783 X |
| 3,343,173 | 9/1967 | Cooley | 358/302 X |
| 3,842,406 | 10/1974 | Sheridon | 346/151 X |
| 3,965,461 | 6/1976 | Wreede et al. | 346/151 X |
| 4,033,673 | 7/1977 | Seki | 340/783 X |
| 4,110,922 | 9/1978 | Leemann-Ditmann | 340/783 X |
| 4,236,156 | 11/1980 | Eden | 340/783 X |
| 4,335,390 | 6/1982 | Axford | 358/302 X |
| 4,442,429 | 4/1984 | Kotani et al. | 340/786 |
| 4,458,258 | 7/1984 | Amaya et al. | 346/153.1 |
| 4,493,882 | 1/1985 | Kaneko et al. | 430/97 |

*Primary Examiner*—Marshall M. Curtis
*Assistant Examiner*—Vincent P. Kovalick
*Attorney, Agent, or Firm*—Fitzpatrick, Cella, Harper & Scinto

[57] ABSTRACT

The present invention provides an image display apparatus including an image bearing web in the form of an endless belt on which an erasable image is formed. The erasable image is then carried to a display portion by the image bearing web. The length of the image bearing web is selected to be equal to or more than twice the length of the displayable region in the display portion. The image bearing web being movable independently of image forming process, whereby the image on the web which has already passed by the display portion can be returned to the display portion, permitting repetitive display function and improving the display apparatus in operation.

6 Claims, 8 Drawing Figures

FIG. 5-1
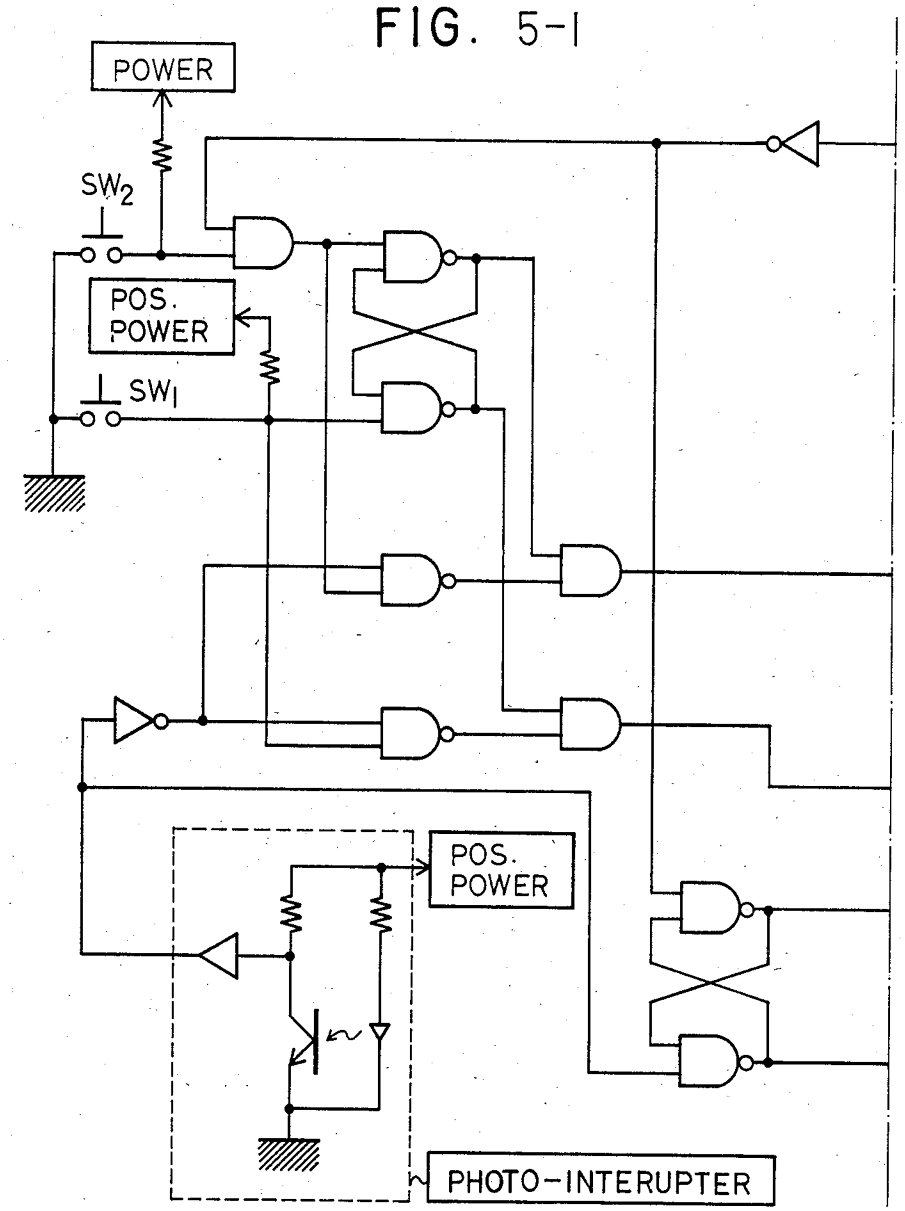
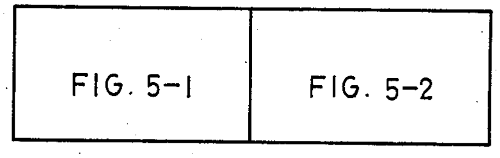
FIG. 5

IMAGE DISPLAY APPARATUS

BACKGROUND OF THE INVENTION

1. Field of the Invention

The present invention relates to an image display apparatus for displaying data in computers, facsimiles and the like, and more particularly to an apparatus for forming and displaying an image on a repetitively usable image bearing web in the form of a belt.

2. Description of the Prior Art

In the prior art, a cathode ray tube (CRT) is currently used as an image display apparatus. Where a CRT is utilized to display a still image such as a letter, a figure or the like, a random access memory (RAM) as an IC memory is generally used together with the CRT in connection with picture elements of a picture to store the information of image which will be read out for display.

In general, it may often be required that the image display apparatus displays the previously displayed image repetitively. In order to fulfill such a requirement, the image display apparatus including the CRT is provided with a RAM capable of storing data for a plurality of pictures to allow a new picture to be displayed without the necessity of clearing the RAM of the data for the picture currently on display. Thus, the respective pictures can be re-displayed at any time by reading out the information which has been stored in the RAM. The RAM required to store the information of all the pictures must have an extremely great capacity and is then substantially expensive. Also, the image display apparatus using the CRT has another problem of unsatisfactory resolving power.

An image display apparatus of thermal recording type is known as having a great capacity with respect to information of pictures. This apparatus comprises a reversible heat-sensitive recording web, for example, of $Ag_2HgI_4$ which is a compound of silver, mercury and iodine, and a thermal head for recording an image on the heat-sensitive recording web. Such a compound, $Ag_2HgI_4$, changes in color in accordance with the change of temperature and has a hysteresis with respect to temperature. Therefore, if an image is recorded on a belt-shaped film containing $Ag_2HgI_4$ by the use of the thermal head, the image can be displayed by maintaining the temperature of the film by the use of a planar heater and erased by cooling the film at room temperature or by the use of a cooler. Thus, the film can repetitively be utilized.

There is also known an image display apparatus of electrophotographic type in which an electrophotographic type photosensitive member is scanned by a light beam which has been modulated in accordance with image signals, to form a toner image on the photosensitive member. This toner image will be displayed. Thereafter, the toner image can be removed by the use of subsequent light beam application so that the photosensitive member can repetitively be used.

The image display apparatus of either heat-sensitive recording type or electrophotographic type has an advantage in that it has an extremely great capacity of display and a good resolving power. For example, if there are eight dots per one millimeter and when there is displayed an image having dimensions of 200 mm$\times$300 mm, picture elements as many as three million, eighty hundred and fourty thousand can be displayed. If there are 16 dots per one millimeter, the number of picture elements reaches fifteen million, three hundred and sixty thousand. In order to redisplay the previously displayed image in such an image display apparatus, a random access memory (RAM) is similarly used to store all the display information, that is, all picture elements of one entire picture entirely. Thus, the RAM must have a great capacity, resulting in an extremely expensive structure increased in size. For example, if LSI memories of 64 kilo-bit are used to store the information of fifteen million, three hundred and sixty thousand of picture elements, it is required that the number of LSI memories is 235. Considering memory drive circuits and associated power supply and others, the image display apparatus will be considerably bulky and costly.

The prior art image display apparatus of thermal recording type or the like involves another problem that a speed for which an image is being displayed is not very high. This is also one of various causes of disadvantages produced when the aforementioned memories are used. For example, the thermal recording type image display apparatus is adapted to write the respective picture elements on the image bearing web successively and exactly while the latter is mechanically moving. Accordingly, the complete display of a picture requires a period of time in the range of a few seconds to several tens of seconds. Of course, this period cannot be reduced even when the previously displayed image is re-displayed after it has been once stored in the memory.

SUMMARY OF THE INVENTION

It is an object of the present invention to overcome the aforementioned disadvantages in the prior art image display apparatus of the above type and to provide an image display apparatus which can re-display the previously displayed image without need of memory means having great capacity.

Another object of the present invention is to provide an image display apparatus which has a reduced period of time required to effect the re-display.

To accomplish the above objects, the present invention provides an image display apparatus which comprises a display section for allowing observation of an image formed on an image bearing web in the form of an endless belt which is movable within a casing, the image bearing web having such a length that two or more images to be observed in the display section can be formed thereon; a plurality of support members movably supporting the image bearing web; drive means for moving the image bearing web along the support members; means for forming a visible image on the image bearing web; and means for making the image forming means inoperative when the image formed on the image bearing web is again to be introduced into the image display section after the image bearing web has passed by the image display section.

When the image held on the image bearing web is returned to the display section, the image bearing web in the form of an endless belt can be moved in either the forward or rearward direction. To obtain a proper image, it is preferred that means for erasing the formed image and other components which would disturb the image are retracted from the passage of the belt, if necessary.

DESCRIPTION OF THE PREFERRED EMBODIMENTS

The present invention will now be described in connection with the drawings.

Figure 1:
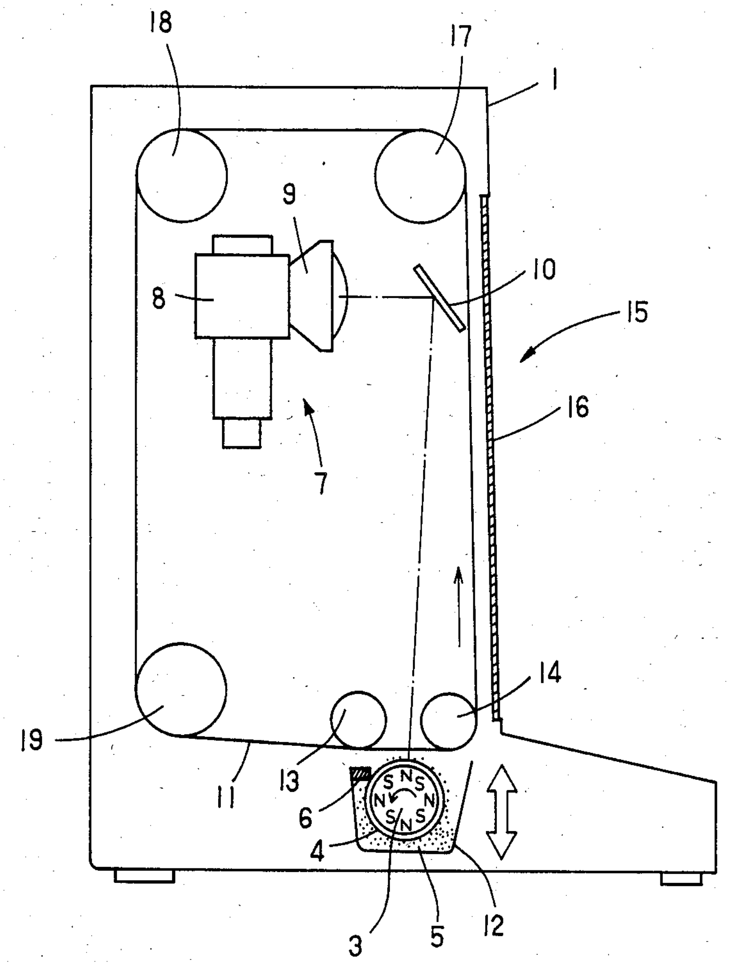
FIG. 1 is a cross-sectional view of an electrophotographic type image display apparatus to which the present invention is applied.

FIG. 1 shows an embodiment of an image display apparatus of electrophotographic type to which the present invention is applied. The image display apparatus comprises a casing 1 in which a light beam outputted from a semiconductor laser and modulated by imagewise electric signals impinges on the inner face of an image bearing member 11, and scans the same by a scanner 8 in an optical system 7 in one direction, which member 11 is a photosensitive web in the form of an endless belt. The optical system 7 includes an f·θ lens 9 and mirror 10. The image bearing member 11 will be referred to simply as "photosensitive web" for the purpose of simplicity. The photosensitive web 11 is moved in the direction shown by an arrow and formed, for example, of a polyethylene terephthalate film which includes an electrically conductive film of oxidic indium tin formed on the surface thereof and a photoconductive layer of CdS formed on the electrically conductive film with a binder of resin. The CdS used is doped with copper and indium to provide a sensitivity for the infrared rays in the light beams ejected from the semiconductor laser. In the exposure position, a development device 12 is located opposite to the photosensitive web 11. The development device 12 includes a sleeve 4 within which a magnet 3 is disposed to be rotatable in the direction shown by an arrow.

Toner 5 having electrically conductive and magnetic properties is supplied to the surface of the sleeve 4 and uniformly regulated by a blade 6 before the toner contacts the surface of the photosensitive web 11. DC voltage is applied between the sleeve 4 of the development device and the substratum of the photosensitive member from a source of DC voltage (not shown). Adjacent to the exposure and development positions there are disposed rollers 13 and 14 which function to maintain the moving photosensitive web 11 flat therebetween. Thus, the distance between the surface of the photosensitive member and the sleeve 4 of the development device can properly be held constant. The toner image formed on the surface of the photosensitive web 11 at the position of the development device is moved to a display section 15 at which the photosensitive web 11 is once stopped. In this display section, the toner image on the photosensitive web 11 surface can be observed externally through a transparent glass sheet 16.

In such an arrangement, photo-carriers are produced in the bright area on the surface of the photosensitive member which is illuminated by the light of image. On the contrary, the toner is charged with a polarity opposite to that of the photo-carriers. Therefore, the toner will be deposited on the surface of the photosensitive web 11 under the action of coulombic force to form a desired toner image thereon as the photosensitive web 11 is moving. In other words, a writing is carried out by the illumination of image light. The toner so deposited will not influence the re-formation of image as the photosensitive web 11 is again moved to the development position. Therefore, the illustrated embodiment of the image display apparatus according to the embodiment does not require any particular cleaning means for cleaning the remaining toner on the photosensitive web 11.

Figure 2:
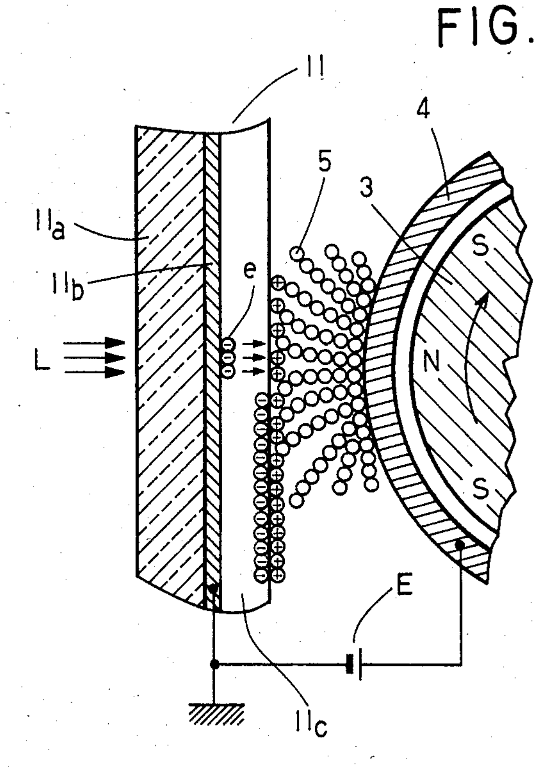
FIGS. 2 and 3 illustrate the principle of image formation used in the apparatus shown in FIG. 1.
Figure 3:
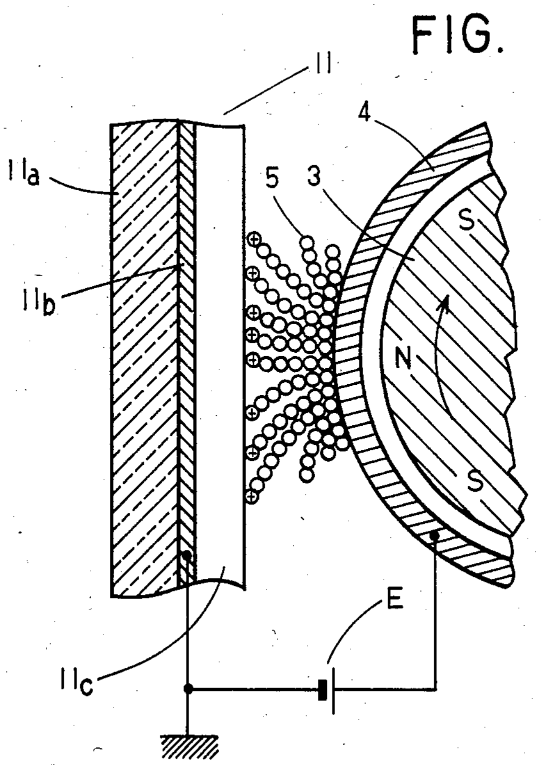

FIGS. 2 and 3 illustrate the principle of image formation which is used for the photosensitive web 11 in the image display apparatus shown in FIG. 1.

FIG. 2 represents the state of charge in the bright area of the information light. When the toner 5 contacts the photosensitive web 11 while a voltage is being applied to the toner through the sleeve 4, an electric field is applied to the photoconductive layer 11*c* of the photosensitive web 11. At this time, if the information light is projected onto the photoconductive layer 11*c*, photo-carriers e are produced therein and then moved to near the surface of the photoconductive layer 11*c* under the action of the electric field. As a result, a strong electrostatic attraction force acts between the toner 5 and the photoconductive layer 11*c* so that the toner 5 will be deposited on the photoconductive layer 11*c*, that is, the surface of the photosensitive web 11.

In the illustrated embodiment, the photoconductive layer 11*c* is of an N-type semiconductor, while a positive voltage is applied to the toner 5. Accordingly, photo-carriers e, which have been produced within the photoconductive layer 11*c* adjacent to the substratum on the projection of the information light L, can satisfactorily be moved toward the surface of the photoconductive layer 11*c*. As a result, a strong electrostatic attraction force will act between the toner 5 and the photosensitive web 11 to deposit the toner 5 on the photosensitive member 11.

FIG. 3 shows the state of charge in the dark area. When an electric field is applied across the toner 5 and the transparent photoconductive layer 11*b* of the substratum, an electrostatic attraction force acts therebetween. Since, however, the photoconductive layer 11*c* is located between the toner 5 and the photoconductive layer 11*b* to provide a distance therebetween, the above electrostatic attraction force is smaller. The toner 5 is therefore forced to separate from the photoconductive layer 11*c*, that is, the surface of the photosensitive web 11 due to various causes such as the magnetic force of the rotating magnet 3 disposed within the fixed sleeve 4, and the force by which the particles of the toner 5 are attracted to one another and so on.

When it is desired to form a new image on the photosensitive web 11, it can be formed simply by passing the photosensitive web 11 through the exposure and development position. In other words, if the toner holding portion of the photosensitive web 11 is to be changed to the non-toner-holding portion thereof, the toner 18 reduced in electrostatic attraction force is removed from the photosensitive web 11 under the influence of the magnetic field of the magnet 16 to provide a bright area having no toner. On the other hand, if the toner holding portion is not changed to the non-toner holding portion, photo-carriers e are again injected thereinto under the action of information light so that the toner 18 will still be held on the photosensitive web 11 against the action of the magnetic field. Therefore, the toner image on the surface of the photosensitive web 11 will not affect the subsequent formation of image. This means that an additional cleaning means is not required in the image display apparatus.

In FIGS. 2 and 3, reference numeral 11*a* denotes a polyethylene terephthalate film and reference letter E designates a source of voltage for the sleeve 4.

The first toner image formed on the photosensitive web 11 in accordance with the above principle of image formation is moved away from the display section 15 by moving the photosensitive web 11 again in the direction shown by the arrow after the first image has been observed. At the same time, the second toner image may be moved into the display section 15. When the second toner image is positioned within the display section 15, the photosensitive web 11 is stopped so that the second toner image can be observed through the glass 16.

The illustrated embodiment is characterized by the feature that the circumference of the endless belt-shaped photosensitive web 11 is such that at least one toner image in addition to the first toner image which is being displayed in the image display section 15 can simultaneously be kept formed on the photosensitive web 11.

Namely, when the first toner image is moved away from the display section 15 and at the same time the second toner image is introduced into the display section 15 by moving the photosensitive web 11 counterclockwise as viewed in FIG. 1 after the first toner image has been observed, the first toner image travels along the run between a drive roller 17 and guide rollers 18, 19 without being erased. If the photosensitive web 11 is subsequently moved in the reverse direction, that is, clockwise as viewed in FIG. 1, the first toner image can be re-displayed in the display section 15. This eliminates the need of re-formation of a new image corresponding to the first toner image. In this case, the movement of the photosensitive member 11 can be set at any speed, for example, a speed twice the normal speed through a transmission, since no formation of image is required.

However, the presently displayed toner image will be erased when the photosensitive web 11 passes by the development device 5 in the reverse movement. It is, therefore, desirable on the reverse movement of the belt that the development device 5 can be moved downwardly by a predetermined distance into a position where the development device has no influence on the already formed image by any suitable means, such as a combination of drive means such as a plunger with a linkage, or that an image corresponding to the formed image can be re-recorded starting at a position to which the belt is returned.

As another method for re-introducing the previously displayed image into the display section, it may be considered that the development device 5 is moved downwardly to the position having no influence to all the toner images on the photosensitive web 11 and then the belt-shaped photosensitive web 11 is moved in the forward direction (that is, counterclockwise as viewed in FIG. 1) by a predetermined distance. This provides such an advantage that the photosensitive web 11 can be made to move only in one direction.

An example of the drive means for the apparatus shown in FIG. 1 will be described with reference to FIG. 4.

Figure 4:
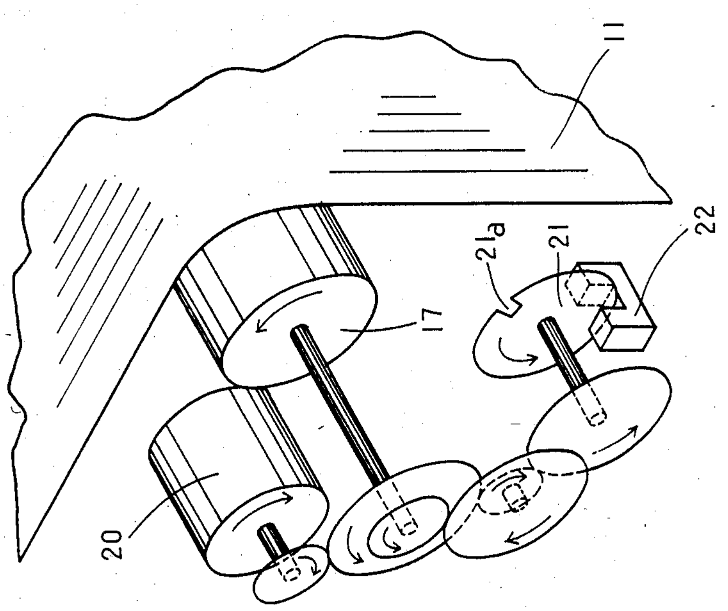
FIG. 4 is a perspective view of a drive for a photosensitive member.

A drive mechanism for the photosensitive web 11, which is shown in FIG. 4, includes a DC motor 20 driving the drive roller 17 through a gearing. This DC motor 20 is reversible such that it can be rotated either clockwise or counterclockwise in accordance with the direction of voltage which is applied to the motor. The DC motor also drives an encoder 21 through reduction gears with a complete revolution thereof corresponding to the movement of the photosensitive web 11 for one complete picture. The encoder 21 includes a notch 21*a* formed therein at the periphery thereof, which notch can be detected by a photo-interrupter 22 to sense the movement of the photosensitive web 11 relative to the image display section.

Figures 2, 5:
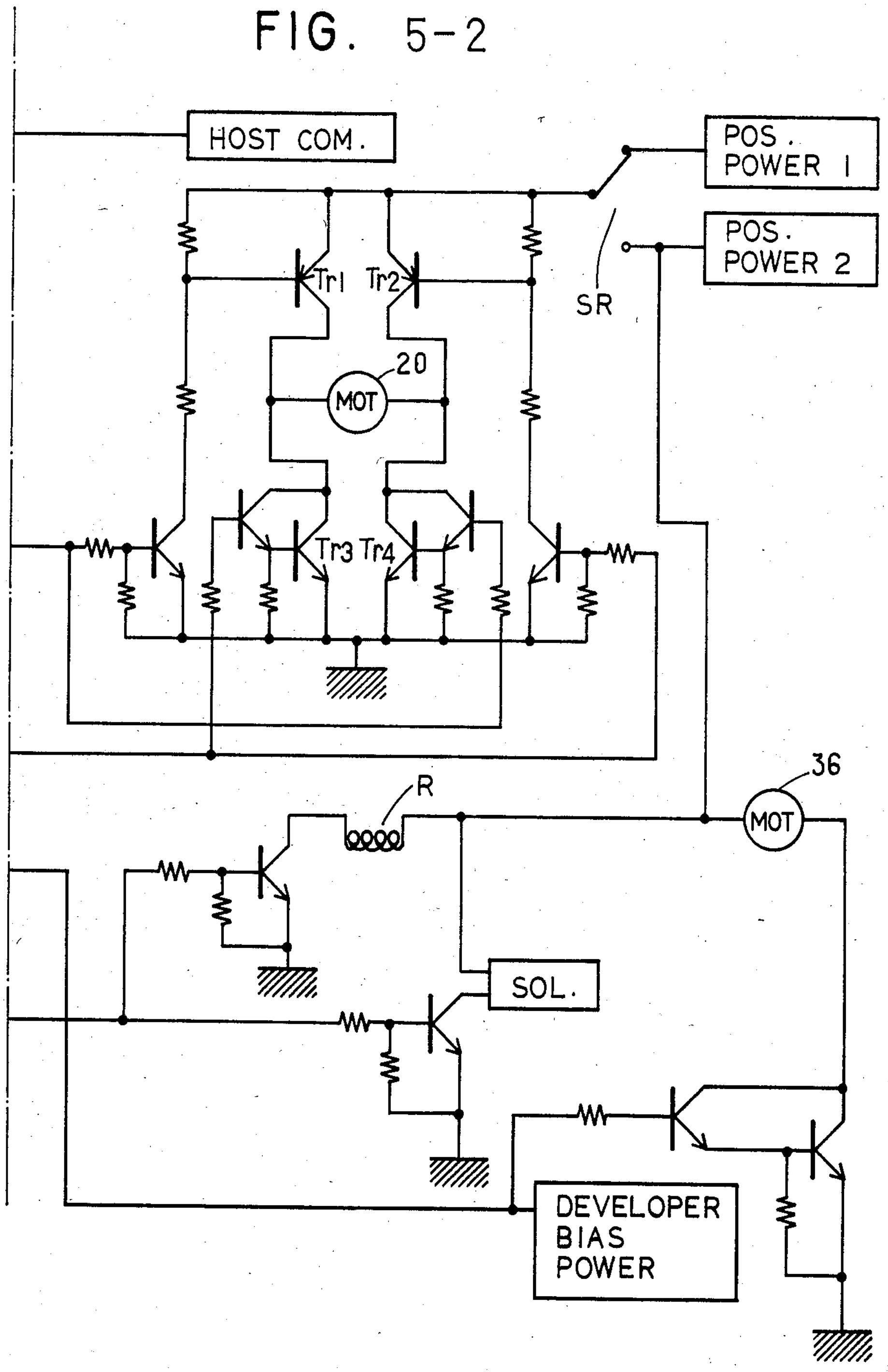
FIG. 5 is a circuit diagram of a control which can be used in the apparatus shown in FIG. 1.

FIG. 5 is a circuit diagram of a control for the above DC motor and the whole image display apparatus.

In FIG. 5, if a positive (+) pulse is supplied from a host computer to the control circuit, the DC motor 20 is energized to rotate the photosensitive web 11 counterclockwise as viewed in FIG. 1. When the notch 21*a* in the encoder 21 is detected by the photo-interrupter 22, the photosensitive web 11 is temporarily stopped. If the positive pulse is supplied from the host computer to the control circuit, a motor 36 for rotating a magnet roller within the development device 12 is energized while maintaining a solenoid for moving the development device 12 away from the photosensitive web 11, which will be described hereinafter, at OFF state. At the same time, an instruction signal from the host computer is applied to a laser modulator (not shown) to initiate a formation of image in accordance with the above-described principle of image formation. A bias is applied to the development device to energize the sleeve 4 thereof at the same time as the development motor 36 begins to rotate. The above solenoid is normally in ON state except on writing an image, so that, the sleeve 4 is held spaced away from the photosensitive web 11. If an image corresponding to one complete picture is formed on the photosensitive web 11, the latter is then stopped by the detection signal from the photo-interrupter.

If a switch SW1 on an operation board is turned on, the DC motor 20 is reversed to rotate through the amount corresponding to one complete picture and then stops. If the switch SW1 is kept at its ON state, the DC motor 20 continues to rotate in the reverse direction until the same switch is released to its OFF state at which the photosensitive web 11 will be stopped. If a switch SW2 is depressed to its ON state, the DC motor 20 is energized to rotate in the forward direction so that the photosensitive web 11 will be moved counterclockwise as viewed in FIG. 1, through an angular distance corresponding to one complete picture. The DC motor 20 is connected to transistors TR1, TR2, TR3 and TR4. Two of these transistors TR1 and TR4 are turned on as the DC motor is rotated in the forward direction while the other two transistors TR2 and TR3 are turned on as the DC motor is rotated in the reverse direction.

When no image is to be formed on the photosensitive web 11, that is, if the solenoid SN is energized, it is preferred to move the photosensitive web 11 at higher speed. In this case, a voltage for driving the DC motor 20 is selected by relay contacts RS in a relay which can be actuated in accordance with the ON or OFF condition of the solenoid SN. In other words,the revolution of the motor can be controlled in accordance with the voltage applied thereto.

Figure 6:
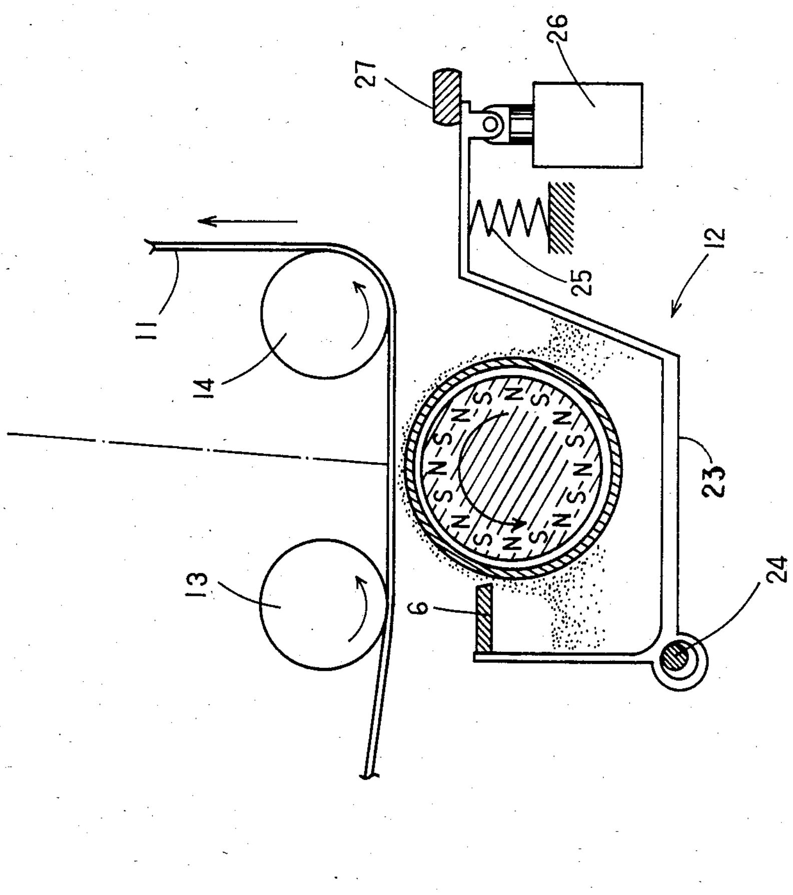
FIG. 6 is a cross-sectional view of a mechanism for moving a development device away from the photosensitive member.

FIG. 6 shows a lifting mechanism for the development device 12, which mechanism comprises a pivot shaft 24 pivotably supporting the vessel 23 of the development device, a spring 25 urging the vessel 23 counterclockwise about the pivot shaft 24, and a plunger 26 adapted to rotate the vessel 23 clockwise against the action of the spring 25 to move the sleeve 4 away from the photosensitive web 11. This plunger 26 is associated with the solenoid SN shown in FIG. 5. The counterclockwise movement of the development device 12 is limited by a stopper 27.

Figure 7:
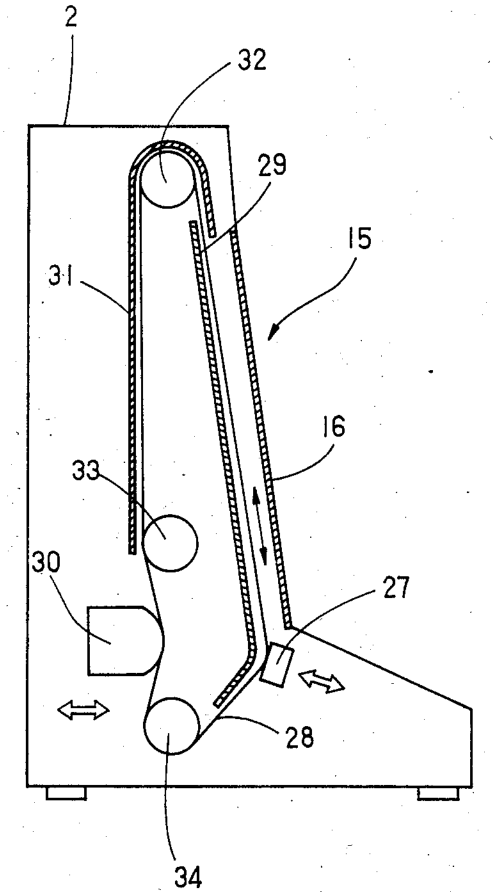
FIG. 7 is a cross-sectional view of another embodiment of the image display apparatus to which the present invention is applied.

FIG. 7 shows an embodiment of a thermal type image display apparatus to which the present invention is applied. The thermal recording type image display apparatus comprises a heat-sensitive recording web 28 in the form of an endless belt which is moved in the direction shown by an arrow and on which an image is recorded by a thermal recording head 27.

Within the image display region, an image formed on the belt-shaped heat-sensitive recording web 28 by the recording head 27 is maintained, at its state as it is formed, by the use of a planar heater 29 which is located inside and opposite to the image display section 15. The temperature of the recording web 28 is kept at about 40° C. The image on the heat-sensitive recording web 28 can be erased by a cooling unit 30.

The embodiment illustrated in FIG. 7 is also characterized in that the circumference of this endless belt-shaped heat-sensitive recording web 28 is so selected that at least one image in addition to the first image which is being displayed in the display section 15 can be formed on the heat-sensitive recording web 28, and that even if that portion of the recording web 28 on which the image is formed is moved out of the display section, this image is held on the recording web 28 by another planar heater 31 disposed as shown in FIG. 7. In such a manner, the image can be held on the recording web 28, after the image has been observed, and re-displayed in the display section by moving the heat-sensitive web 28 in the reverse direction.

Operations of the re-display of image is similar to those of the previous embodiment. More particularly, where it is desired to maintain the first image or the other one image when the belt-shaped recording web 28 is moved in the forward or rearward direction, the thermal recording head 27 and/or the cooling unit 30 are moved away from the surface of the heat-sensitive recording web 28 by drive means such as a plunger or solenoid or a linkage including levers and others, if necessary. The image display apparatus further comprises a drive roller 32 for driving the recording web 28 and guide rollers 33 and 34 for guiding the same. The movement of the recording web 28 in the opposite directions can be carried out by the same arrangement as in the first embodiment.

There will now be described a process in which an image is formed on the photosensitive web 11 after the first image has been re-displayed and has been observed in the image display apparatus shown in FIG. 1. If the second image is in the process of being formed on the web 11 upstream relative to the first image, it is preferably re-formed from the beginning because it is not expected to provide an image of high quality due to the slippage and resiliency in the belt if the remaining portion of the image is again formed after the image has been halfway formed. The condition of image can be detected by comparing the position of the encoder with an image formation signal. For example, if the encoder does not reach a predetermined position although an image formation signal has been supplied, it can be judged that the second image is under the formation.

The present invention can use any other system which can form and erase an image on the image bearing web, such as a magne-stylus system as described in U.S. Pat. No. 3,914,771.

It is understood from the foregoing that the present invention provides various advantages in that the display can be effected without need of any great capacity memory, in that the previously displayed image can more easily be re-displayed, and in that the image bearing web can be moved at higher speed on the redisplay to improve the operation of display.

What is claimed is:

1. An image display apparatus for observing visible discrete images formed on an image bearing web, said apparatus comprising:

a display section for allowing observation of an image which has been formed on an image bearing web in the form of a belt movable within a casing, said image bearing web having such a length that two or more images can be formed thereon for observing one of them in said display section;

a plurality of support members for movably supporting said image bearing web;

drive means for moving said image bearing web along said support members;

image formation means for forming a visible image on said image bearing web, said image formation means being movable between a first position wherein it is relatively far from the web and a second position wherein it is relatively near the web for image formation;

means for instructing to reintroduce into said display section the image on said image bearing web after it has passed by said display section; and control means responsive to said instructing means for moving and stopping the web to reintroduce the once displayed image that has passed by said display section back into said display section and for moving said image formation means from said second position to said first position and maintaining said image formation means in said first position when the once displayed image is reintroduced into said display section.

2. An image display apparatus as defined in claim 1 wherein said image bearing web is moved in a direction opposite to a direction in which said drive means moves the web with said image formation means being in said second position, when the image on said image bearing web is to be reintroduced into said display section after the image has passed by said display section.

3. An image display apparatus as defined in claim 1 wherein said image bearing web is further moved in the same direction as a direction in which said drive means moves the web with the image formation means being in said second position, when the image on said image bearing web is to be reintroduced into said display section after the image has passed by said display section.

4. An apparatus according to claim 1, wherein said image bearing web includes a photosensitive layer, and said image formation means contains toner, with which the visible image is formed on the web.

5. An apparatus according to claim 1, wherein said control means, in response to the instruction of said instruction means, controls said drive means to drive said web at a speed higher than that when no instruction is produced by said instruction means.

6. An apparatus according to claim 1, wherein said image bearing web includes a photosensitive recording material, and said image forming means includes a planar heater to keep the image on the web, said planar heater having an area which is two or more times the area of said display section.

* * * * *